July 29, 1941.   A. J. RONNICK   2,251,168

CRANK HANDLE

Filed March 5, 1940

INVENTOR.
ALBERT J. RONNICK.
BY Louis V. Lucia
ATTORNEY.

Patented July 29, 1941

2,251,168

UNITED STATES PATENT OFFICE 2,251,168

CRANK HANDLE

Albert J. Ronnick, Hartford, Conn.

Application March 5, 1940, Serial No. 322,335

3 Claims. (Cl. 74—543)

This invention relates to crank handles and more particularly to handles for the cranks of fishing reels; wherein it is desirable to have a handle which can be firmly gripped so as to avoid slippage of the fingers from the handle.

The primary object of this invention, therefore, is to provide a handle for the crank of a fishing reel having a surface contour which is adapted to fit the fingers of the hand so that the said handle may be held firmly during the turning of said crank.

A further object is to provide such a handle having means for retaining it in normal position, wherein certain surface portions thereof are properly positioned to be quickly engaged by the corresponding finger tips with a natural movement of the hand, regardless of the position of the crank.

Further objects will be more clearly understood from the following description and from the accompanying drawing in which.

Figure 1:
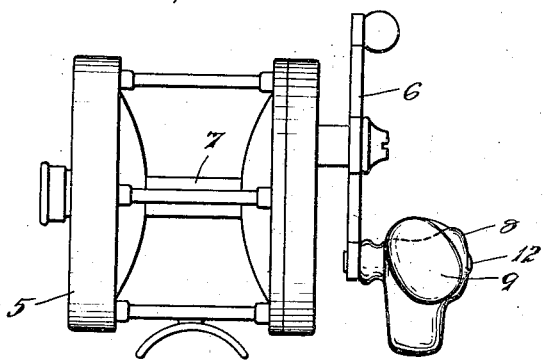
Fig. 1 is a front view of a fishing reel showing my improved handle thereon.

As illustrated in the drawing, the numeral 5 denotes a fishing reel of common form having the usual crank 6 for rotating the spool 7.

My invention contemplates a handle 8 which is shaped to provide surfaces corresponding to the contour of the fingers that are naturally used in gripping such handles.

Figure 2:
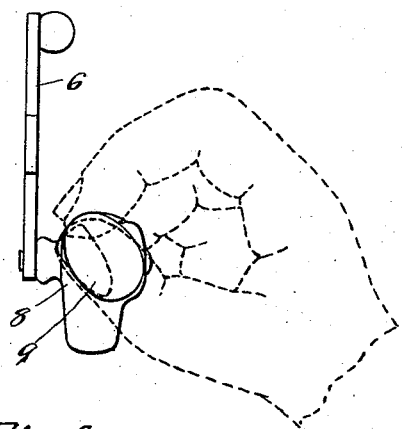
Fig. 2 is a side view of the crank and handle only, illustrating the manner in which said handle is gripped and fits the fingers of the hand.
Figure 3:
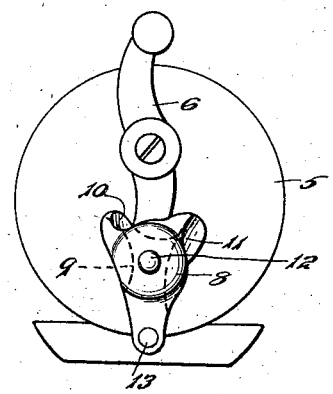
Fig. 3 is a side view of the invention as illustrated in Fig. 1.
Figure 4:
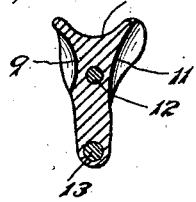
Fig. 4 is a side view of the handle in central vertical section.

As illustrated, the recessed surface 9 is provided, at one side of the handle, to be engaged by the thumb finger, the recess 10 to be engaged by the index finger, and the recess 11 to be engaged by the middle, or third, finger of the hand which is illustrated in dotted lines in Fig. 2.

The said handle is connected to the crank 6 by means of a pin 12 whereon it rotates freely and, if desired, the said pin may be provided also with a weight 13 for the purpose to be hereinafter described.

It is well recognized that fishing reels and, particularly, those for use in heavy fishing, require a firm grip so as to prevent accidental slippage of the handle due to the strenuous jerking and pulling on the line by the fish.

This invention is also highly advantageous in casting; where the line is thrown out, causing the crank to revolve rapidly, and then comes to a stop, at which time it must be quickly grasped and revolved in order to draw in the bait.

In the operation of my invention, the weight 13 will normally retain the handle in the position illustrated in the figures of the drawing, in which position the finger fitting surface portions thereof are properly disposed to be rapidly gripped by the respective fingers with a natural movement of the hand. This permits proper engagement of the handle without requiring that the user look at the handle to determine its position.

The contoured recesses permit an easy grip which will also eliminate blisters and callouses on the fingers, from heavy fishing and, at the same time, provide for a hold by the fingers which cannot be readily broken by slippage, because of the fact that the fingers will fit in the corresponding recesses on the handle in such a manner that they cannot readily slip off therefrom.

This invention is also advantageous for night fishing, since it is not necessary that the handle be seen in order that it be properly gripped.

I claim:

1. A handle of the character described, for a crank or the like, comprising a rotatably mounted member having a contour including depressions conforming with the shape of the thumb, index and middle finger of the human hand, and means utilizing gravity for normally retaining said handle in proper position to dispose said recesses in a position corresponding to the normal position of the said fingers during the natural movement of the hand to grip said handle.

2. A handle of the character described, for a crank or the like, comprising a member adapted to be rotatably mounted on said crank and having an outer surface including depressions conforming with the shape of the thumb, index and middle fingers of the human hand, and means including a depending portion on said handle for retaining the same, by gravity, with said depressions normally in position to be quickly engaged by a natural movement of the hand to grip said handle with the said fingers.

3. For a fishing reel crank or the like, a rotatably mounted handle having means for retaining it, by gravity, in a pre-determined position, irrespective of the position of said crank, and concaved surface portions on said handle conforming with the shape of fingers of the human hand whereby said handle may be gripped, in pre-determined position, by a natural movement of the hand, and slippage between the fingers and said handle is prevented.

ALBERT J. RONNICK.